United States Patent Office 3,048,527
Patented Aug. 7, 1962

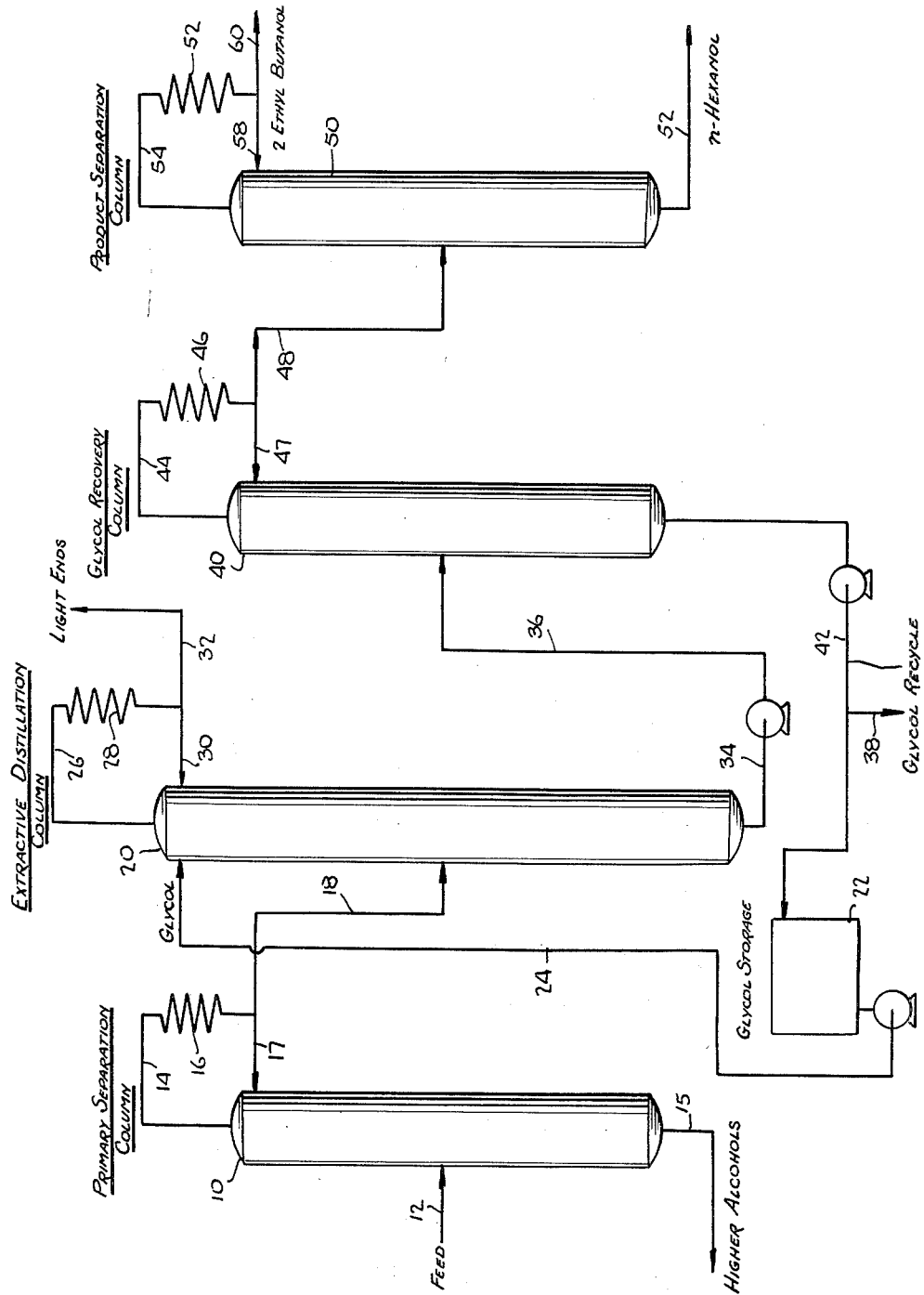

3,048,527
EXTRACTIVE DISTILLATION OF HEXANOL WITH A POLYHYDRIC ALCOHOL AS A SOLVENT
Tibor Gyoerkoes, New Martinsville, W. Va., assignor to Celanese Corporation of America, New York, N.Y., a corporation of Delaware
Filed Oct. 10, 1958, Ser. No. 766,522
13 Claims. (Cl. 202—39.5)

This invention relates to the recovery and purification of higher alcohols from a crude mixture. More particularly this invention relates to the separation of hexanols from a mixture of high boiling alcohols, aldehydes, acetals, ketones, esters, and various other organic impurities. The separation is effected by means of an extractive distillation process.

Many processes for the production and recovery of lower alcohols, such as ethyl, propyl, butyl, result also in a residue of high boiling materials generally consisting of glycols, high boiling point alcohols, and unknown impurities. Thus the high boilers remaining after recovery of normal butyl alcohol from a butanol synthesis process contain appreciable amounts of 2-ethyl-butanol, n-hexanol, octanols, and still higher alcohols. In addition non-alcoholic compounds are present.

Although it has long been recognized that substantial quantities of valuable alcohols are present in such residue streams, recovery thereof by fractional distillation has not been possible primarily because the boiling point of non-alcoholic constituents present in the streams are very close to that of the alcohols. Other attempts at purification and recovery which have been made involve acid hydrolysis followed by hydrogenation, or caustic washing. By and large, however, the separation procedures attempted by the art have not been successful in recovering pure alcohols. In the instance of the butanol high boilers recovery of the 2-ethyl-butanol content in 95% purity has not heretofore been possible. To compete with other sources of 2-ethyl-butanol, the recovered by-product alcohol should assay over 95% in purity.

The prime object of the instant invention is to provide a distillation process for recovering hexanol in high purity.

A further object of the instant invention is to provide a process for separating the high boiling residue from a butyl alcohol recovery unit marketable products.

Other objects of this invention will be apparent from the following detailed description and claims. In this description and claims all proportions are by weight unless otherwise indicated.

Briefly stated, this invention provides for extractively distilling a crude hexanol cut with a liquid polyhydric alcohol and thereafter stripping hexanol from the hexanol-polyhydric alcohol product.

Thus a wide boiling point range alcohol feed stock would first be fractionated to remove components boiling lower than the $C_6$ alcohols, e.g. butanol, then the bottoms product fractionated to take overhead the hexanol cut which serves as feed for the extractive distillation. It should be appreciated, however, that the instant process is particularly adapted to treat the high boilers remaining after recovery of n-butanol from a mixture which is obtained in the production of n-butanol from acetaldehyde (by the conventional method involving autocondensation of the acetaldehyde to form acetaldol, dehydration of the acetaldol to produce crotonaldehyde and then hydrogenation of the crotonaldehyde, e.g. in liquid phase in the presence of Raney nickel, to form successively butyraldehyde and butanol). Ordinarily the initial feed stock would be a high boiling point material largely comprising $C_6$ and higher alcohols with only minor percentages of lower boiling components. In this instance, preliminary fractionation would be needed only for removal of the $C_8$ alcohol and other components boiling higher than the hexanol. In any event, the material fed to the extractive distillation should be a crude hexanol cut.

The polyhydric alcohol should be one which is liquid at room temperature and stable at the distillation temperatures. A preferred class of extractants are the glycols, such as alkylene glycols, e.g. ethylene glycol; 1,2 propylene glycol is especially suitable. Other polyhydric alcohols, such as glycerol may be employed.

Alternative oxygenated solvents such as dimethylphthalate were not satisfactory; their use resulted in little or no purification of the hexanols. Also, hydrocarbon solvents such as kerosene or mineral oil, tried in a specific effort to pass hexanols out in the overhead stream, were unsatisfactory. Mineral oil foamed too badly to be of value while kerosene introduced still additional impurities into the hexanol product.

In the course of experimentation, it has been found that wide ranges of extractant:feed stock ratios may be employed in the practice of the instant invention. For example, about two to five parts of extractant per part of feed stock has been employed, about 3 parts of extractant per part of feed stock giving best results.

Preferably the entire recovery procedure is operated under a moderate vacuum to prevent product decomposition.

For more complete understanding of the instant invention and its practice, reference is made to the accompanying drawing which represents a flow plan of the overall process and a diagrammatic view in elevation of the accompanying apparatus for effecting recovery of hexanols from a crude feed mixture already stripped of low boilers like butanol and lower alcohols. While the preferred embodiment of the process hereafter described relates to purification and recovery of 2-ethyl butanol and n-hexanol employing propylene glycol as the extractive distillant, it should be understood that the invention is by no means so limited, the detailed description being for exemplary purposes.

Referring now to the drawing, primary separation column 10, e.g. a 20-plate distillation column is fed from line 12 to an intermediate plate with the crude feed mixture of high boiling alcohols. The low boilers like butanol have already been stripped from the mixture. Primary separation column 10 is operated to effect a crude hexanol cut, whereby the bulk of the hexanol content and substantially all of the impurities in the same or lower boiling point range are removed as overhead through line 14, while the higher boiling components comprising most $C_8$ and higher alcohols are removed as bottoms through line 15 and withdrawn from the system. The higher boiling point components may be separately sold or disposed of in some suitable fashion.

The overhead in line 14 (generally boiling in the range of about 118 to 160° C. at atmospheric pressure) is liquefied in condenser 16, a portion thereof being recycled through line 17 as reflux for column 10, and the remainder passed through line 18 to some suitable intermediate plate of extractive distillation column 20. Glycol from propylene glycol storage vessel 22 is pumped through line 24 and introduced at the top plate of column 20 to serve as the extractant. The overhead product from extractive distillation column 20 which passes out through line 26 is liquefied in condenser 28. These light ends are in part recycled through line 30 for reflux in column 20 and the remaining part removed from the system through line 32. Since the light ends in line 32 have a substantial content of lower alcohols it is contemplated that these light ends would ordinarily be sent to the butanol recovery system.

The bottoms product of column 20 consists essentially of mixed hexanols and glycol. This bottoms product is removed through line 34 and pumped or otherwise forced through line 36 to glycol recovery column 40. A straight forward fractionation in distillation column 40 serves to separate this product into a hexanol overhead and a glycol bottoms. The glycol bottoms are recycled back through line 42 to the storage unit 22 for eventual reuse in extractive distillation in column 20. Repeated use of the same propylene glycol to effect recovery of hexanols from stripped butanol high boilers has evidenced no impurity build-up in the propylene glycol, making glycol purification unnecessary. Should contamination appear, some or all of the glycol being recycled through line 42 may be bled off via line 38 and any necessary makeup can be added directly to the glycol storage vessel 22.

The hexanol overhead from glycol recovery column 40 is removed through line 44, then liquefied in condenser 46, and except for reflux recycle through line 47 passed via line 48 into product separation column 50. A straight forward fractionation in column 50 separates the hexanol product into n-hexanol bottoms and a 2-ethyl butanol overhead. The n-hexanol bottoms product is removed to storage through line 52. The 2-ethyl butanol product is removed through line 54, then liquefied in condenser 56. A portion is returned as refluxed through line 58, and the balance is taken off to storage through line 60. The 2-ethyl butanol product will ordinarily assay over 95% impurity.

It may be pointed out that inasmuch as the overhead product from the extractive distillation can be recycled for recovery of its butanol content, practice of the instant invention introduces a certain measure of flexibility into a proceeding butanol recovery system. For example, the butanol recovery system may now be operated for recovery of maximum purity butanol, inasmuch as butanol lost thereby in higher boiling fractions will eventually return as part of the overhead product from extractive distillation tower 20.

For better understanding of the invention the following specific examples are presented.

EXAMPLE I

A butanol-containing fraction was obtained by hydrogenation of crotonaldehyde in liquid phase in the presence of Raney nickel catalyst using hydrogen at superatmospheric pressure. The crotonaldehyde used was obtained by dehydration of acetaldol which was in turn obtained by aldol condensation of acetaldehyde. The butanol-containing fraction was distilled at a temperature of 118° C. and a pressure of 14.7 p.s.i.a. to strip off butanol and still lower alcohols to give a residual high boiling fraction boiling in the range of 120 to 250° C. at a pressure of 14.7 p.s.i.a.

4500 ml. of these high boilers were charged to a 20 plate fractionating column operated under a pressure of 350 mm. Hg abs. and with a 3 to 1 reflux ratio to take overhead a crude 2-ethyl-butanol-normal hexanol cut which amounts to 42% of the initial charge. The detailed yield data and product analysis from the initial fractionation is shown by the following table.

Table I

| Cuts | Total ml. | Percent 2-Ethyl Butanol Content | ml. 2-Ethyl Butanol | Percent of Total |
| --- | --- | --- | --- | --- |
| Charge to column | 4,500 | 21.66 | 975 | 100 |
| Crude hexanols (recovered) | 2,024 | 46.8 | 949 | 97.3 |
| Light ends | 164 | 3.56 | 5.7 | 0.6 |
| Residue | 2,316 | <0.1 | | 0.2 |
| Handling loss | | | | 1.9 |

1112 ml. of this hexanol cut was fed to a three section extractive distillation column having an estimated 40 theoretical trays. Anhydrous 1,2-propylene glycol was injected at the top of the column in a ratio of three parts glycol to one of hexanol feed. A fifteen to one reflux ratio was maintained and the extractive distillation was operated at a pressure of about 200 mm. Hg abs., under substantially anhydrous conditions.

The bottoms from the extractive distillation (propylene glycol-hexanol mixture) was then fractionated at a 5 to 1 reflux ratio in a 35 tray Oldershaw column operated under 150 mm. Hg abs. pressure to strip the hexanols from the glycol, the recovered glycol being recycled back to the extractive distillation.

The stripped alcohols were then refractionated on a six foot glass column having an estimated 60 theoretical trays (at total reflux) using a 10 to 1 reflux ratio.

The overall process resulted in recovery of 91.6% of the total 2-ethyl-butanol initially present in the high boilers. Its purity exceeded 95%. The detailed operational data of the extractive distillation, the glycol recovery, and the hexanol product fractionation is given in the following table.

Table II

| Cuts | Total ml. | Percent 2-Ethyl Butanol Content | ml. 2-Ethyl Butanol | Percent of Total |
| --- | --- | --- | --- | --- |
| Feed, crude hexanols | 1,112 | 46.8 | 520 | 100 |
| Light ends of extractive distillation | 124 | 13.6 | 16.7 | 3.1 |
| Product | 505 | 96.8 | 489 | 94.1 |
| Residue | (¹) | (¹) | (¹) | |
| Handling loss | | | | 2.8 |

¹ No appreciable amount.

EXAMPLE II 5900 lbs. per hour high boilers stripped of butanol, as in Example I, is charged to a primary separation tower (7 foot 20 tray, fed at the ninth plate), operated at a top pressure of 6.8 p.s.i.a. and a temperature of 260° F. Approximately 42% of the feed stock goes overhead as 2-ethyl-butanol, n-hexanols, and low boiling impurities. A 4 to 1 reflux ratio is maintained. The higher boiling point alcohols like the $C_8$ and higher (the remaining 58% of the feed) are removed from the base of the column as bottoms and withdrawn from the system.

The hexanol overhead is fed to an extractive distillation column (at tray 12 of a 3 foot 30 tray column). 7620 lbs. of 1,2-propylene glycol are fed near the top of the column (tray 28). The propylene glycol by virtue of its continuous recycle in the system contains about 1% of 2-ethyl-butanol. Substantially no water is present in the extractive distillation column. This column is operated, at a top pressure of 4 p.s.i.a., a top temperature of 230° F., and a 10 to 1 reflux ratio. The overhead stream consists mainly of n-butanol and acetal impurities, and is removed at a rate of 700 lbs. per hour.

The bottoms stream from the extractive distillation consists mainly of 2-ethyl-butanol, n-hexanol, and propylene glycol. This stream is fed to a propylene glycol recovery column operated at 4 p.s.i.a., at a top temperature of 240° F., and a 5 to 1 reflux ratio. Suitably this column is a 2½ foot tray tower and the feed may enter at tray 10. In this column, hexanols are stripped from the propylene glycol which is returned to storage and eventually recycled to the extractive distillation column.

The overhead stream of hexanols is then fed to the product fractionation column, suitably a 4 foot 30 tray column fed at tray number 16 and operated at 4 p.s.i.a. with a top temperature of 230° F. and a reflux ratio of 10 to 1. The overhead product amounts to 1490 lbs. per hour, assaying over 95% 2-ethyl-butanol. Over 90% of the 2-ethyl-butanol present in the initial feed stream is recovered in this pure state. The bottoms product amounts to 360 lbs. per hour, and is about 80% n-hexanol.

It is to be understood that the foregoing detailed description is given merely by way of illustration and that many variations may be made therein without departing from the spirit of my invention.

Having described my invention, what I desire to secure by Letters Patent is:

1. A process for recovering hexanol from a crude mixture of high boiling alcohols which comprises fractionating said mixture to recover therefrom an overhead containing the bulk of the hexanol together with butanol and acetals and a bottoms product containing only minor quantities of hexanol but substantially all of the still higher alcohols in the initial mixture, thereafter extractively distilling the hexanol containing overhead in the presence of a substantially anhydrous liquid polyhydric alcohols as extractant to recover therefrom an overhead containing the bulk of the non-alcoholic impurities and of the lower alcoholic impurities and a bottoms product containing primarily hexanol and extractant, then fractionating the hexanol bottoms product into extractant and hexanol, and recycling the recovered extractant to the extractive distillation.

2. The process of claim 1 wherein the recovered hexanol is subsequently fractionated into 2-ethyl-butanol and n-hexanol.

3. The process of claim 1 wherein the fractionations all occur at sub-atmospheric pressure.

4. The process of claim 1 wherein propylene glycol is employed as the extractant.

5. A process for recovering hexanol from a crude hexanol mixture containing acetals and butanol which comprises extractively distilling the hexanol mixture in the presence of a substantially anhydrous liquid aliphatic glycol as extractant to recover therefrom a bottoms product containing hexanol and extractant and an overhead product containing the bulk of the non-alcoholic impurities and of lower boiling alcohols including butanol, then fractionating the hexanol bottoms product into hexanol and extractant, and recycling the extractant to the extractive distillation.

6. The process of claim 5 wherein the recovered hexanols are subsequently fractionated into 2-ethyl-butanol and n-hexanol.

7. The process of claim 5 wherein the fractionations all occur at sub-atmospheric pressure.

8. The process of claim 5 wherein propylene glycol is employed as the extractant.

9. The process of claim 5 wherein the overhead product of the extractive distillation is treated to recover the butanol content therefrom.

10. Process for recovering hexanol from a crude hexanol obtained by removal of butonal, by distillation, from a mixture produced by hydrogenation of crotonaldehyde, which comprises extractively distilling the crude hexanol in the presence of a substantially anhydrous liquid polyhydric alcohol as extractant to recover therefrom a bottoms product containing hexanol and extractant and an overhead product containing the bulk of the non-alcoholic impurities and of lower boiling alcohols and then recovering hexanol from the bottoms product.

11. Process as set forth in claim 10 in which the extractant comprises propylene glycol.

12. Process as set forth in claim 10 in which the boiling range of said crude hexanol fed to the extractive distillation is about 118 to 160° C. at a pressure of 14.7 p.s.i.a.

13. A process for recovering hexanol from a crude hexanol mixture containing acetals and butanol by extractive distillation which comprises feeding the crude hexanol mixture to a fractional distillation zone at an intermediate point thereof, feeding a substantially anhydrous liquid aliphatic glycol as extractant to said fractional distillation zone at a higher point, removing from said zone a bottoms product containing hexanol and extractant and an overhead product containing the bulk of the non-alcoholic impurities and of lower boiling alcohols including butanol, then fractionating the hexanol bottoms product into hexanol and extractant, and recycling the extractant to the extractive distillation.

References Cited in the file of this patent

UNITED STATES PATENTS

| | | |
|---|---|---|
| 2,455,803 | Pierotti | Dec. 7, 1948 |
| 2,551,584 | Carlson et al. | May 8, 1951 |
| 2,552,412 | Drout et al. | May 8, 1951 |
| 2,663,703 | Dinnerstein | Dec. 22, 1953 |
| 2,664,435 | Burton et al. | Dec. 29, 1953 |

FOREIGN PATENTS

| | | |
|---|---|---|
| 563,164 | Great Britain | Aug. 1, 1944 |
| 678,191 | Great Britain | Aug. 27, 1952 |
| 148,544 | Sweden | Jan. 25, 1955 |